United States Patent [19]
Roy et al.

[11] Patent Number: 5,361,102
[45] Date of Patent: Nov. 1, 1994

[54] SYSTEM TO CANCEL GHOSTS IN NTSC TELEVISION TRANSMISSION

[75] Inventors: Sumit Roy, Philadelphia, Pa.; Chandrakant B. Patel, Hopewell, N.J.; Jian Yang, Philadelphia, Pa.

[73] Assignee: SamSung Electronics Co., Ltd., Suwon, Rep. of Korea

[21] Appl. No.: 754,895

[22] Filed: Sep. 4, 1991

[51] Int. Cl.⁵ .................................... H04N 5/213
[52] U.S. Cl. ................................. 348/611; 348/614
[58] Field of Search .................. 358/167, 36, 166, 37, 358/905, 141, 146, 147; 348/611, 614, 478; H04N 5/213

[56] References Cited

U.S. PATENT DOCUMENTS

| | | | |
|---|---|---|---|
| 4,896,213 | 1/1990 | Kobo | 358/905 |
| 5,060,067 | 10/1991 | Lee | 358/167 |
| 5,065,242 | 11/1991 | Dieterich | 358/167 |
| 5,103,312 | 4/1992 | Citta | 358/167 |

*Primary Examiner*—James J. Groody
*Assistant Examiner*—Sherrie Hsia
*Attorney, Agent, or Firm*—Robert E. Bushnell

[57] ABSTRACT

A new technique for channel characterization for Advanced Compatible TV (ACTV) broadcasting systems is hereby proposed that conforms to the current practice of transmitting a ghost cancellation reference (GCR) signal during the vertical blanking interval (VBI). A copy of the GCR signal is stored at the receiver, and is used to extract the effective ghost channel parameters via digital signal processing techniques. A pair of equi-length, binary (±) sequences is said to be complementary if the sum of the linear autocorrelation functions of the sequences is identically zero for all shifts other than zero, and provides a high correlation gain at zero shift. Such sequences can be sequentially transmitted on the allotted VBI line in the appropriate fields, along with pairwise constant signals in the corresponding fields of a basic eighth field sequence. To conform to the positivity constraint of the transmitted signal for NTSC compatible systems, each complementary sequence is transmitted on a pedestal. At the receiver, the effect of the common constant signals are first removed by subtraction and the resultant signals are correlated with each of the two complementary sequences. The output of the correlators are added to directly yield estimates of the channel coefficients.

6 Claims, 6 Drawing Sheets

SYSTEM TO CANCEL GHOSTS IN NTSC TELEVISION TRANSMISSION

FIELD OF THE INVENTION

The current inventions relate generally to a system, apparatus and method for improving the quality of television pictures and more particularly to the reduction or elimination of ghost images.

BACKGROUND OF THE INVENTION

The multipath reception of NTSC television images, commonly referred to ghosting, is a widespread problem both for signals received directly off-air and for signals received from cable TV systems. Recent advances in digital signal processing technology make it both practical and economical to implement a ghost canceling system is consumer television receivers that will eliminate, or at least substantially reduce, the deleterious effects caused by multipath reception.

Ghost images, commonly referred to a "ghosts", are as common occurrence in received television pictures. As compared with the predominant image produced by a signal received by a direct path, a ghost is produced by a time-delayed, usually attenuated, and distorted version of the proper television signal, having been received by way of a path other than the direct path. A signal path other than the direct path is referred to as a multipath. Generally, the delay and attenuation may be either positive or negative. Thus, it is possible to have a pre-ghost or a ghost with a larger amplitude than the main signal. The parameters of a ghost signal may also be time-varying.

Multipaths can be broadly classified into long and short multipaths. A long multipath manifests itself as a secondary ghost image displaced horizontally with respect to a predominant image, whereas a short multipath influences high video frequencies. Its effect is typically observable as an apparent increase or decrease in image sharpness, accompanied in some cases by loss of some image information. The attenuation of high video frequencies can lead to a 'soft' appearance in the picture. Short multipaths are typically of concern in cable distribution systems and generally arise from termination mismatches and multiple echoes, commonly called "macro-ghosts". Long multipath ghosts are typically reduced by cancellation schemes whereas short multipath effects are typically alleviated by waveform equalization, generally by peaking and/or group-delay compensation of the high frequency video response.

The phenomenon of television ghosts has been addressed with a view to improving picture quality by reducing or eliminating ghosts. See, for example, W. Ciciora et al., A Tutorial On Ghost Canceling In Television Receivers, published in the *IEEE Transactions On Consumer Electronics*, volume CE-25, during February 1979, at pages 9–43. Other solutions to the problem of ghosts are described in U.S. Pat. No. 4,896,213, Jan. 23, 1990 to Kobo et al. and U.S. Pat. No. 4,897,725, Jan. 30, 1990, to Tanaka et al., the disclosures of which patents are herein incorporated by reference.

Since the characteristics of a transmitted television signal are known a priori, it is possible, at least in theory, to utilize such characteristics in a system of ghost signal detection and cancellation. Nevertheless, various problems limit this approach. Instead, it has been found desirable to transmit repeatedly a reference signal situated, for example, in a section of the television signal that is currently unused for video purposes and to use this reference signal for detection and cancellation of ghost signals. Typically, lines in the vertical blanking interval (VBI) are used. Such a signal is herein referred to as a Ghost Canceling Reference (i.e., a "GCR") signal.

It has been proposed that a useful test or GCR signal may appropriately exhibit a (sin x)/x waveform. Such a waveform, suitably windowed, exhibits a relatively constant spectral energy density over a frequency band of interest. See, for example, A Tutorial On Ghost Canceling In Television Receivers by W. Ciciora et al. Ghost locations can then be determined for ghost signal cancellation and waveform equalization to reduce the effects of short multipaths.

U.S. Pat. No. 4,896,213 to Kubo notes a ghost canceling signal transmission/reception system which allows a built-in ghost canceling device to reduce or eliminate ghost components attributable to group-delay distortion and frequency-amplitude characteristic distortion generated in a signal transmission path. This is achieved by superimposing a digital signal on a television signal as a ghost canceling reference signal. Thus, in U.S. Pat. No. 4,896,213, a digital signal composed of frame synchronizing signals, clock synchronizing signals, and data signals is generated, and is superposed, during the vertical blanking interval, on a television signal to be transmitted. At the receiving end, the digital signal superposed on the television signal is used as a reference signal in an arrangement that executes a correlative operation of the transmitted television signal to reduce the ghost phenomenon.

In the arrangement of U.S. Pat. No. 4,897,725 to Tanaka, a transmitted reference or GCR signal is also used. A dummy ghost signal is generated and is used for canceling a ghost signal in the transmitted television signal. This is substantially the proposed BTA (Japan) GCR signal, which uses as the main reference, or deghosting, signal a signal having the aforementioned (sin x)/x waveform, principally for its property of a substantial high frequency spectral energy content. Averaging with a pair-wise constant signal is used for deriving a received reference waveform. The received reference waveform is Fourier transformed to provide a set of Fourier coefficients. The transformed reference waveform is then processed with an available Fast Fourier Tranform of an unimpaired GCR to compute the deghosting filter parameters, that is, tap gain information for a transversal filter, for both waveform equalization finite impulse response (i.e., "FIR") and the deghosting filter infinite impulse response (i.e., an "IIR" filter).

As can be expected, the ghost cancelation reference signal is generally received accompanied by its ghost signals and is thus itself a "ghosted" signal. It is herein recognized that the performance of a ghost-canceling system is greatly influenced by the noise and perturbation content of the acquired GCR signal. It is also recognized that a reduction in the noise and perturbation content of the acquired GCR signal is desirable in improving the accuracy of the deghosting filter parameter derivations and in reducing the system complexity.

It is herein further recognized that a step in the signal leading edge is desirable in a GCR signal in computing ghost locations. As previously mentioned, a (sin x)/x waveform provides particular advantages in a GCR signal. Its flat frequency spectrum allows accurate computation of the filter parameters for attenuating multiple image effects as well as computation of the waveform equalizing parameters. The characteristic ripples of the (sin x)/x waveform however, along with other high frequency components, are typically attenuated in a received ghosted GCR, both due to multipath effects as well as effects of antenna misorientation as commonly occurs in practice. Under such conditions, the computation of the waveform equalizing parameters can be significantly in error.

SUMMARY OF THE INVENTION

It is therefore, one object of the current invention to provide an improved circuit and process for reduction, or elimination, of ghost images.

It is another object to provide a circuit and process for reduction, or elimination, of ghost images even at low signal-to-noise conditions.

It is still another object to provide a circuit and process able to attain deghosting parameters within a short time.

It is yet another object to provide a circuit and process for reduction, or elimination, of ghost images, that is easily implemented.

It is still yet another object to provide a circuit and process able to reduce, or eliminate, of ghost images, without inherent information on the range of pre- and post-ghost signals.

The successful implementation of a ghost canceling system requires that the transmitted NTSC signal contain a training signal called a Ghost Canceling Reference (GCR) signal, which can be examined by the receiver to evaluate the multipath distortion suffered by the NTSC signal in the transmission path. By comparing the received distorted GCR signal with a stored reference GCR signal, the receiver can configure an appropriate channel compensating filter to reverse (cancel) the distortion introduced in the transmission path.

The challenge is to design a GCR signal that will permit easy and fast analysis by simple receiver hardware of the entire range of anticipated multipath distortions so that the compensation filter required to channel the distortions can be configured rapidly and accurately. As explained in detail below, a complete ghost canceling system includes a proposed GCR signal and a receiver processing algorithm to meet this challenge.

A ghost canceling system should cancel or at least significantly attenuate, the effects of multipath distortion in the transmission or television images. The signal to which the television receiver synchronized (usually the direct signal received over the shortest path) is called the reference signal. The signals received over other paths are thus usually delayed with respect to the reference signal and appear as trailing ghosts.

It is possible however, that the direct or shortest path signal is not the signal to which the receiver synchronizes. Where the receiver synchronizes to a reflected (longer path) signal, there will be a leading ghost (or ghosts) caused by the direct signal or by the direct signal and other reflected signals of lesser delay than the signal to which the receiver synchronizes. The multipath signals which vary in number, amplitude and delay time from location to location and from channel to channel at a given location.

The visual effects of multipath distortion can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. Usually the direct signal predominates and a receiver is synchronized to the direct signal, and the ghost images are displaced to the fight at varying position, intensity and polarity. These are known as trailing ghosts or "post-ghost" images. When the receiver synchronizes to a reflected signal, there will be ghost images displaced to the left of the reference image. These are known as leading ghosts or "pre-ghost" images.

The effect of multipath signals of relatively short delay with respect to the reference signal is distortion of the frequency response characteristic of the channel. The visual effect in this case is observed as increased or decreased sharpness of the image and in some cases loss of some image information. These short-delay or close-in ghosts are most commonly caused by unterminated or incorrectly terminated radio frequency transmission lines such as antenna lead-ins or cable television drop cables. In a cable television environment, it is possible to have multiple close-in ghosts caused by multiple distortion taps and multiple improperly terminated drop cables of varying lengths. Such multiple close-in ghosts are frequently referred to as micro-ghosts.

The strategy for eliminating ghosts in a television receiver relies on the inclusion of a predetermined training signal known as a Ghost Canceling Reference (GCR) signal as part of the transmitted television signal. This signal, to be included in the vertical blanking interval (i.e., "VBI") of the television signal, will undergo the same multipath distortions as the rest of the television signal. The receiver can then examine the distorted GCR signal it receives and, with a prior knowledge of its correct waveform, can configure an adaptive filter to cancel, or at least significantly attenuate, the multipath distortion. It is important to choose a GCR signal that occupies the least possible real estate in the VBI (preferably only one TV line) and that contains the necessary information for the receiver to analyze the multipath distortion and configure an compensating filter to cancel the distortion.

BRIEF DESCRIPTION OF THE DRAWINGS

A more complete appreciation of these inventions, and many of the attendant advantages thereof, will be readily appreciated as the same become better understood by reference to the following detailed description when considered in conjunction with the accompanying drawings in which like numbers indicate the same or similar components, wherein.

DETAILED DESCRIPTION

Figure 4:
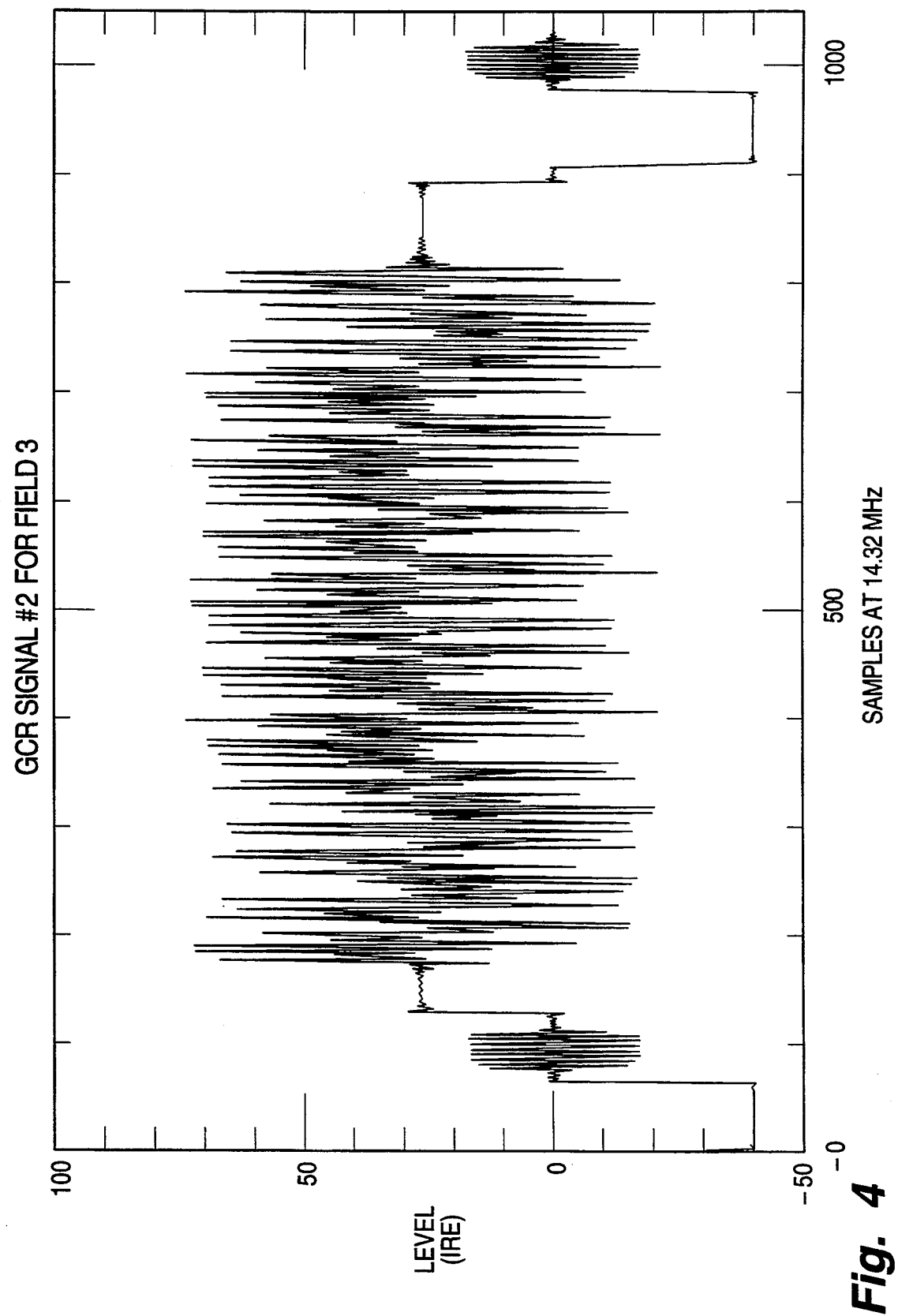
FIG. 4 is a two-coordinate graph illustrating a second complementary sequence of a ghost canceling reference signal according to the principles of the current invention.

In the proposed Complementary Sequence Ghost Canceling Reference Signal, CS-GCRs based on these criteria, the CS-GCR signal for line 2 and field 3, shown in FIG. 4, is designed for minimum VBI line requirement, is simple to adapt for deghosting NTSC television signals, and also suitable for proposed Advanced TV systems. With conventional "pair-wise-constant" signal processing, this CS-GCRs does not have any inherent limitation on the range of pre- or post-ghosts, that is, the ghosts indicated are unambiguous.

The main goal of a ghost canceler in the terrestrial broadcasting environment is to remove the ghost images generated by reflections from terrain features, such as mountains, and from man-made structures, such as buildings, bridges, water towers, etc. A fairly simple signal, such as a 70 IRE 2T or (sin x)/x step, may be adequate for this purpose. However, the GCR signal must perform in varying signal-to-noise conditions over a wide range of pre- and/or post-ghosts and provide the deghosting parameters quickly without ambiguity.

We propose a new technique for channel characterization for advanced compatible television (i.e., ACTV) broadcasting systems, which technique conforms to the current practice of transmitting a ghost cancellation reference (GCR) signal during the vertical blanking interval (i.e., VBI). A copy of the GCR signal is stored at the receiver, and is used to extract the effective ghost channel parameters via digital signal processing techniques. The method is based on the properties of Complementary Sequences, first described by M. J. E. Golay in Complementary Series published in the *IRE Transactions On Information Theory*, volume IT-7, in April 1961, pages 82–87, and subsequently expanded upon by C.-C. Tseng and C. L. Liu in Complementary Sets of Sequences, in the *IEEE Transactions On Information Theory*, volume IT-18, in September 1972, pages 644–652. A pair of equi-length, binary ($\pm 1$) sequences is said to be complementary if the sum of the linear autocorrelation functions of the sequences is identically zero for all shifts other than zero, and provides a high correlation gain at zero shift.

In certain television systems constructed in accordance with the invention, such complementary sequences as manifested in electric signal form are filtered to keep them within the bandwidth constraints for video signal and are transmitted on the allotted VBI line in the appropriate fields, along with pairwise constant signals in the corresponding fields of a basic eight field sequence. To conform to the positivity constraint on the transmitted signal for NTSC compatible systems, each complementary sequence is transmitted on a pedestal. In a television receiver constructed in accordance with an aspect of the invention, the effect of the common constant signals is first removed by substraction, and the resultant signals are correlated with each of the two complementary sequences. The output of the correlators are added to directly yield estimates of the channel coefficients.

An example, a pair of complementary sequences of length 640 is considered. These were constructed using the synthesis procedures described by M. J. E. Golay in Complementary Series published in the *IRE Transactions On Information Theory*, cited above, from smaller complementary pairs of lengths 10 and 64. For transmission, the sequences must be shaped to yield (ideally) a flat spectrum over a 4.2 MHz band. A raised cosine shaping filter with 2% roll-off is used for this purpose. Other complementary pairs of desirable lengths (e.g. 720, 800 etc.) may be similarly constructed.

Complementary sequences have two major advantages compared with other advanced GCR sequences that have been proposed recently. Primary amongst those are the so-called modified maximal length or m-sequences, also variously referred to as pseudo-noise (pn) sequences. These are $\pm 1$ sequences of lengths $N = 2^n - 1$ whose cyclic autocorrelation is zero at all shifts other than zero, and has a peak at zero shift. Pseudo-noise sequences however, have two significant drawbacks.

First, the restriction on the length of pseudo-noise sequences does not allow full exploitation of the available duration on a VBI line, in terms of simultaneously optimizing ghost delay coverage and correlation gains.

Second, the cyclic nature of the pseudo-noise sequence leads to ambiguities in identification of pre- and post-ghosts. For example, a post-ghost close to the maximum delay will appear (falsely) as a pre-ghost. Any attempts to cancel the latter will lead to performance degradation. The complementary sequences have no such drawbacks since (i) their lengths are not limited to $N = 2^n - 1$, and (ii) channel characterization is performed based on linear and not circular convolutions. Hence, these are able to provide superior de-ghoster performance in terms of longer ghost delay coverage and the ability to maintain desired ghost cancellation levels at lower signal-to-noise ratio conditions.

Figure 1:
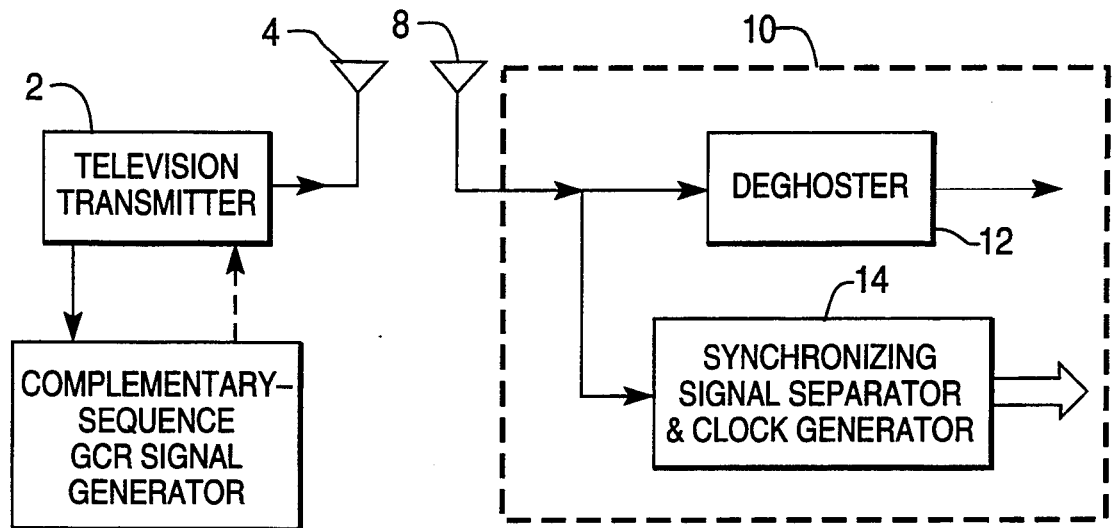
FIG. 1 is a block diagram illustrating one embodiment.

Turning now to the drawings, in the circuit shown in FIG. 1 a television transmitter 2, such a television broadcast transmitter, is coupled to an antenna 4 for transmitting a television signal. A ghost cancelling reference signal generator 6 is coupled to transmitter 2, to supply to transmitter 2 a ghost canceling signal (i.e., a predetermined training signal known as a Ghost Canceling Reference signal, or "GCR") in accordance with the principles of the current inventions. The Ghost Canceling Reference is included within the vertical blanking interval of the television signal transmitted via antenna 4, and received by antenna 8. The Ghost Canceling Reference signal included in the vertical blanking interval of the transmitted television signal will undergo the same multipath distortions as the rest of the television signal.

Figure 2:
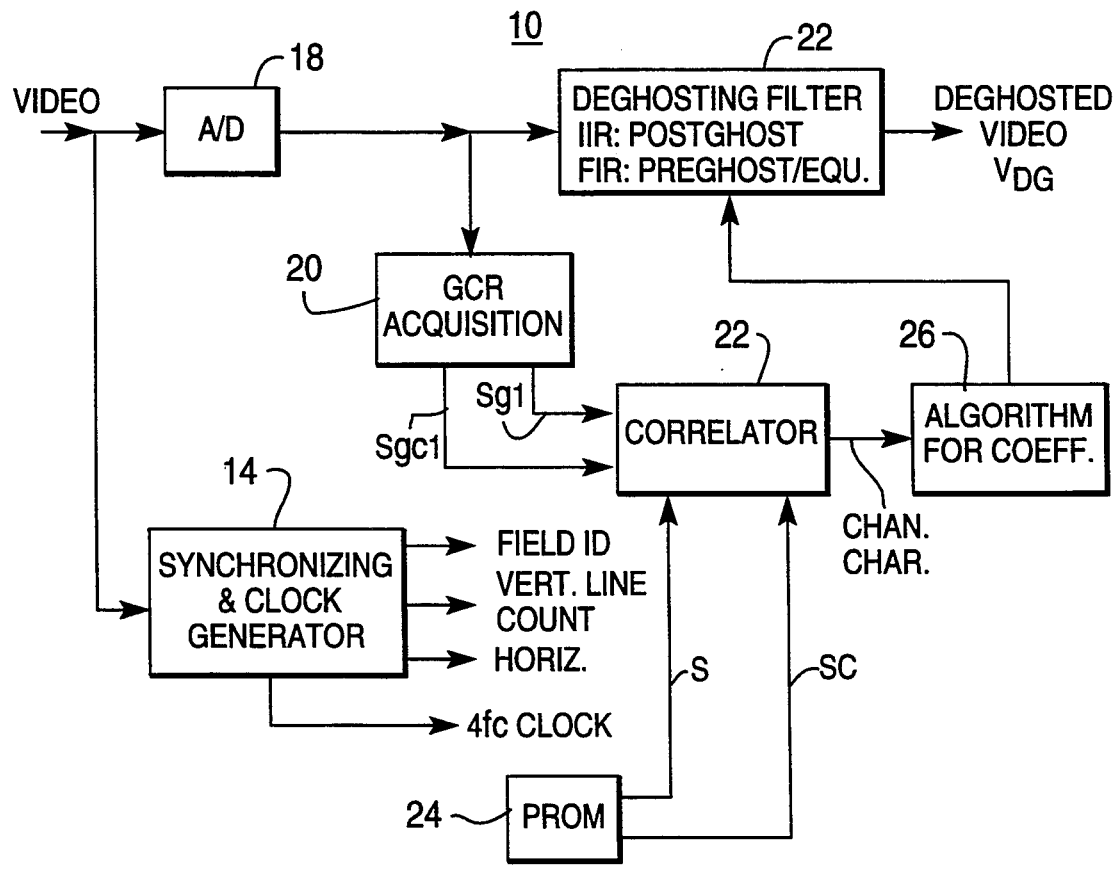
FIG. 2 is a block diagram illustrating in greater detail a portion of a receiver of the embodiment of FIG. 1.

Receiving antenna 8 is coupled to a television receiver 10; a deghoster 12, shown in greater detail in FIG. 2, attenuates, or eliminates, ghost images to provide a "deghosted" video signal $V_{DG}$, while a synchronizing signal separator and clock generator 14 provides field ID, vertical line count, horizontal synchronization and $4f_c$ clock signals. Within receiver 10, the composite video signal is converted into a digital signal by analog-to-digital converter 18, and applied to a ghost cancelation reference signal acquisition stage 20 and to a compensating deghosting filter 22. The components $S_{g1}$ and $S_{gc1}$ derived by acquisition stage 20 are correlated in accordance with the linear convolution described in Tables I and II, by correlator 22 with respective parts of the complementary pair of signals S, SC stored in a memory, such a PROM 24, to provide a channel characterization. The channel characterization is received by controller 26, and applied to configure compensating deghosting filter 22 to cancel distortion due to ghost images received with the video signal.

Figure 3:
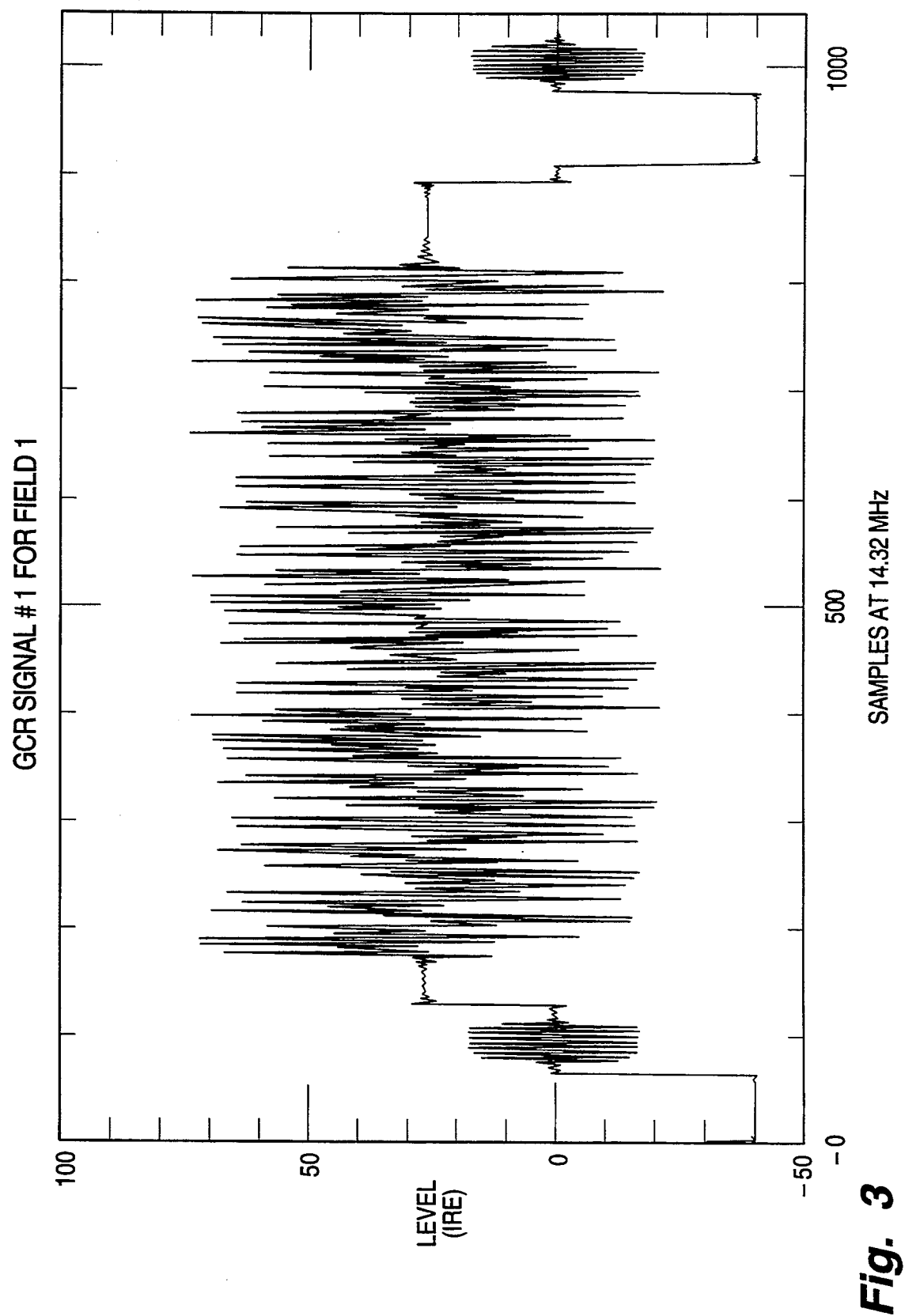
FIG. 3 is a two-coordinate graph illustrating one complementary sequence of a ghost canceling reference signal according to the principles of the current invention.
Figure 5:
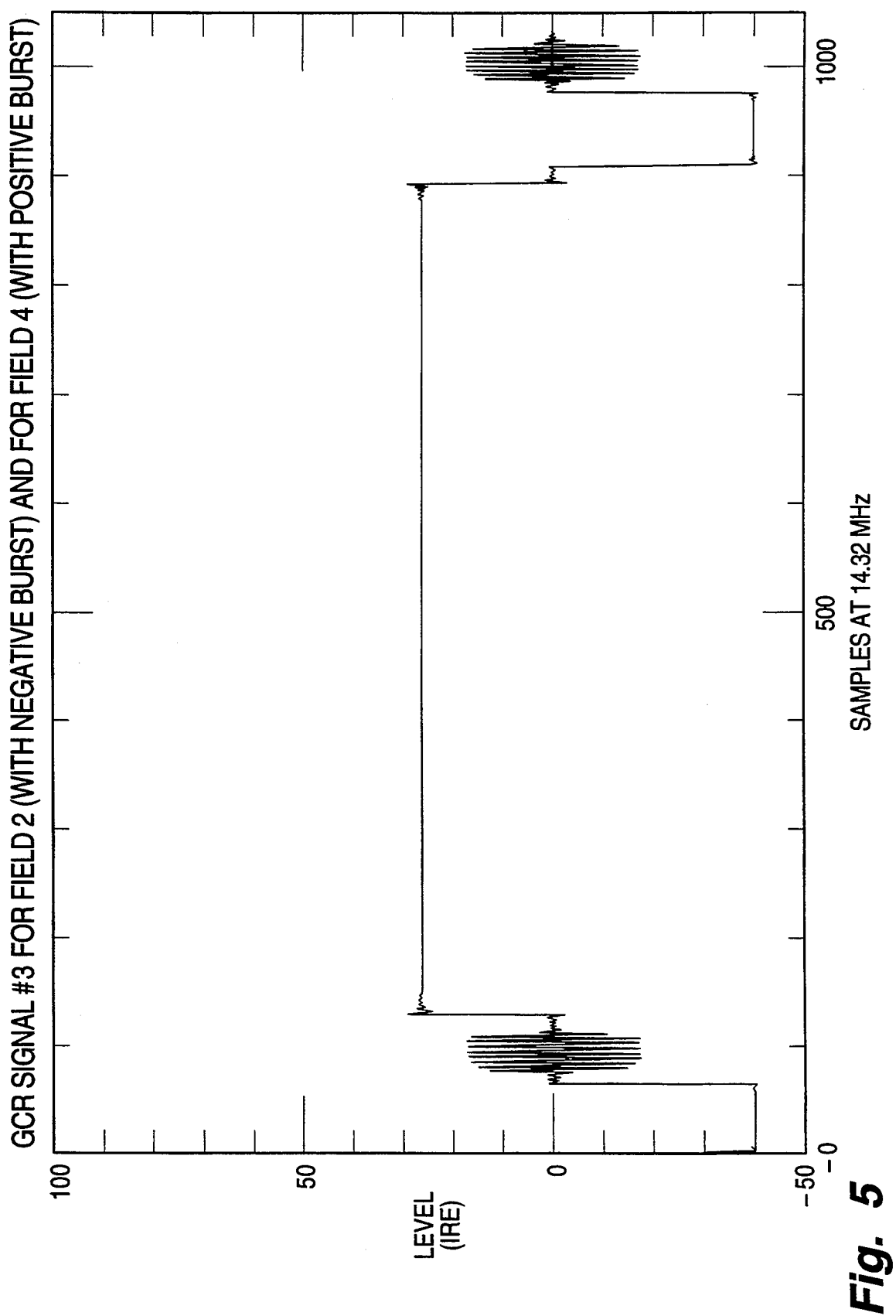
FIG. 5 is a two-coordinate graph illustrating a waveform of a pedestal of a complementary sequence ghost canceling reference signal according to the principles of the current invention.
Figure 6:
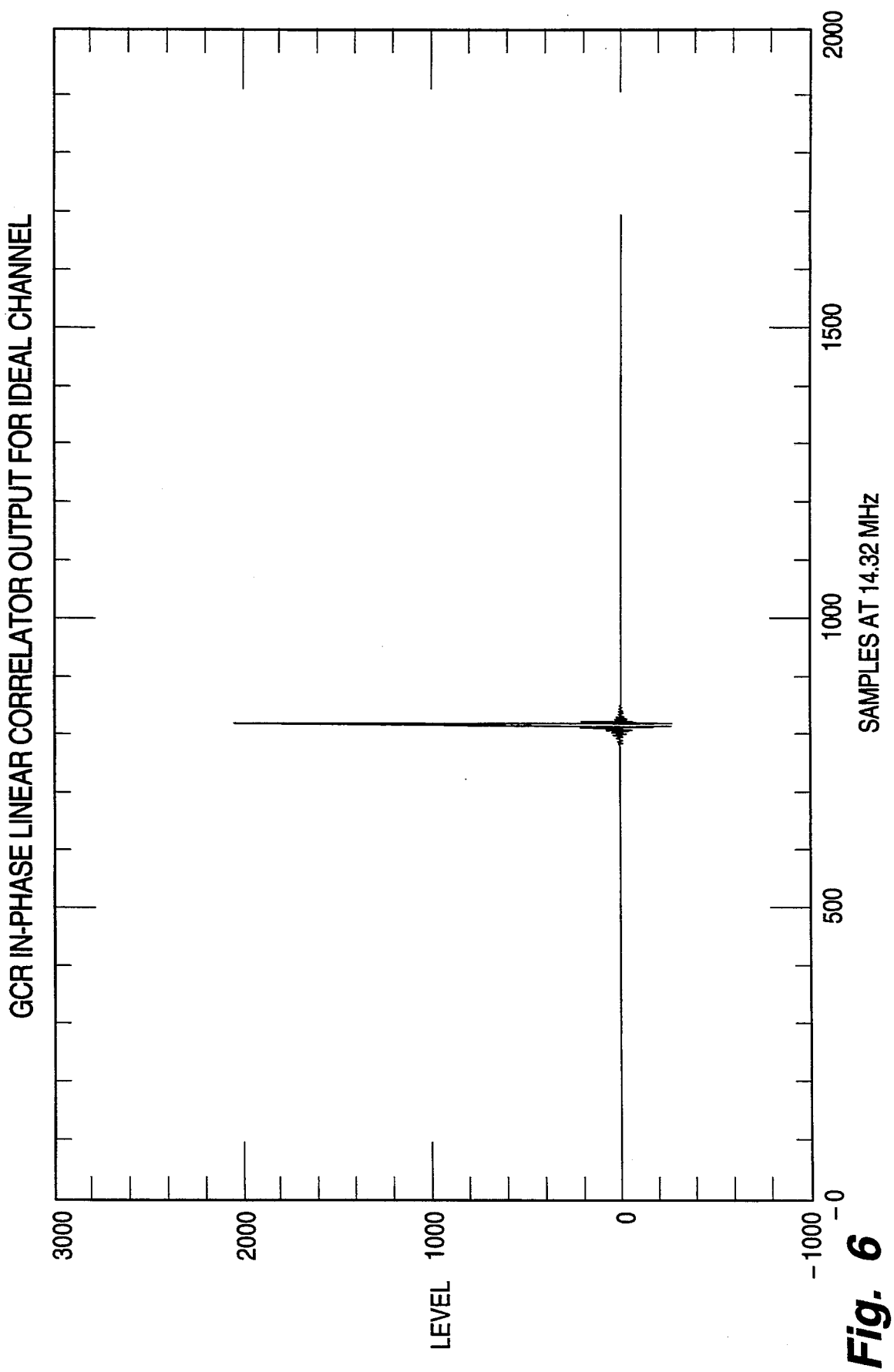
FIG. 6 is a two-coordinate graph illustrating in-phase linear correlator output for an ideal channel.
Figure 7:
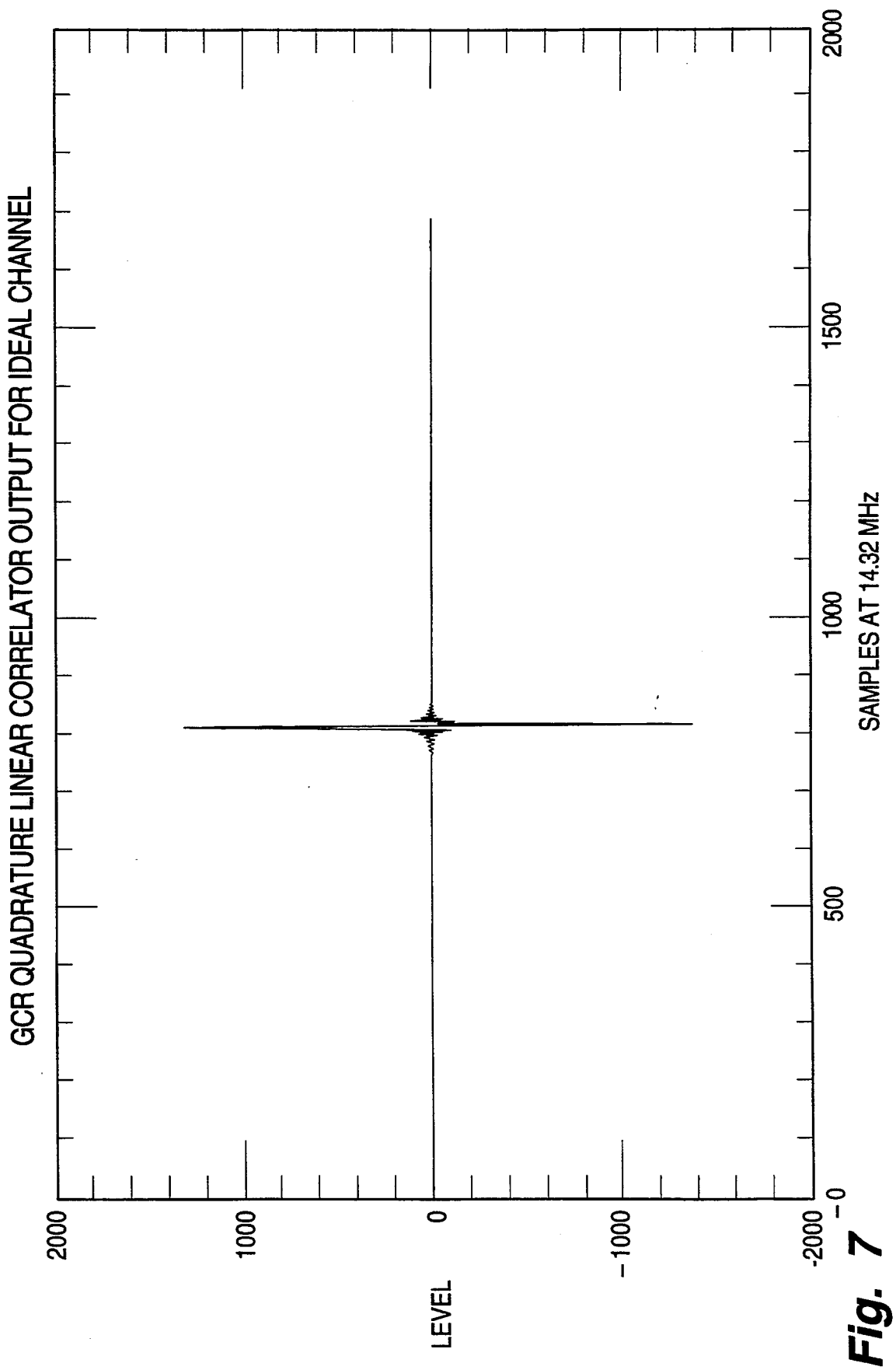
FIG. 7 is a two-coordinate graph illustrating quadrature correlator output for an ideal channel.

Components of the complementary sequence ghost cancelation reference signal are shown in FIGS. 3, 4 and 5. FIG. 3 shows the filtered response to the first binary sequence S, as is superposed on a pedestal waveform during a specified VBI interval of field 1 of each successive cycle of four fields. FIG. 5 shows a pedestal waveform signal inserted into the specified VBI interval of field 2 of each successive cycle of four fields. FIG. 4 shows the filtered response to the second binary sequence CS, as is complementary to the first sequence S and is superposed on a pedestal waveform during the specified VBI interval of field 3 of each successive cycle of four fields. A pedestal waveform signal inserted into the specified VBI interval of field 4 of each successive cycle of four fields is similar to that of FIG. 5, but has positive-sense rather than negative-sense color burst associated therewith. The waveforms shown in FIGS. 3 and 4 arc the two complementary sequences which are transmitted on a pedestal to conform to the positivity constraint on the transmitted NTSC television signals. The pedestal is shown in FIG. 5.

The CS-GCR signal shown, is basically a four field sequence signal occupying one TV line in the VBI per field. An eight field sequence, as shown in Table I, may be used for the "pair-wise-constant" signal processing.

TABLE I

| FOUR Field Test Sig. | BURST Phase | Field # | Eight Field Sequence SC-GCR |
|---|---|---|---|
| S1 | + | F1 | GCR S |
| S2 | − | F2 | 26 IRE Pedestal |
| S3 | − | F3 | GCR SC |
| S4 | + | F4 | 26 IRE Pedestal |
| S1 | + | F5 | 26 IRE Pedestal |
| S2 | − | F6 | GCR S |
| S3 | − | F7 | 26 IRE Pedestal |
| S4 | + | F8 | GCR SC |

GCR S: Part of complimentary pair signal
GCR SC: Other part of complementary signal

TABLE II

SC-GCR
Processing Algorithm:
Sg1 = [(F1−F5) + (F6−F2)]/2, Sg = Sg1*S
Sgc1 = [(F3−F7) + (F8−F4)]/2, Sgc = Sgc1*SC
Channel Characterization:
(Sg + Sgc)/2

*: Linear Convolution

TABLE III

Check:
BURST:
({+−+} + {−−(−)}) = 0, ({−−(−)} + {+−−+}) = 0
Prev. Line Test signals:
({S1 − S1} + {S2 − S2}) = 0, ({S3 − S3} + {S4 − S4}) = 0

The range of the CS-GCR signal is mostly between −10 and 80 IRE with the pedestal signal of 26 IRE. The level of the CS-GCR signal, that is, the pedestal in conjunction with the peak to peak level of the two complementary sequences, displayed in the FIGS. 3 and 4, should be optimized for the television transmission environment. For example, with the expected ghost levels, neither should the negative excursions adversely affect the television synchronizing circuits, nor should the positive excursions cause an unacceptable over-modulation. The pedestal value can be raised or lowered based on the results of the field and lab tests without affecting the intended function of a GCR signal.

The CS-GCR signal is placed in a VBI line. It is described by 763 samples of $4f_{sc}$ clock frequency, $\approx 53.3$ $\mu$seconds.

The CS-GCR signal is designed for a flat spectrum to 4.18 mega-Hertz. While our current design uses a complementary sequence pair of length 640, other lengths are also possible. The sequences are placed on a pedestal for the reasons described above, and are appropriately low pass filtered to $\approx 4.2$ mega-Hertz to meet NTSC signal specifications. The resulting (sin x)/x shape of the sequences increases the length of the complementary sequences to greater than 640. The filtered CS-GCR signal is $\approx 53.3$ $\mu$S long, 763 $f_{sc}$ samples.

The proposed CS-GCR signal can be placed on any VBI line. The signal content of other VBI lines either previous or subsequent to the VBI line containing the CS-GCR signal should be constant in thc sense of "pair-wise-constant" signal processing. Extended deghosting range with this CS-GCR signal is dictated by these VBI lines. The transmitted sequence is shown in Table I.

The ghosted complementary pair of the CS-GCR signal is received and acquired in a television receiver. The effects of the pedestal signal are first removed by subtraction of the equivalent pedestal value from each of the sequences. Each of the resultant sequences is linearly correlated with its respective (complementary) sequence. The linear correlator outputs are added to directly yield a ghosted channel characterization.

The channel characterization is then used to compute the deghosting parameters. An adaptive ghost cancellation should be planned to account for the wide range of ghost environment.

The ghost environment shows that generally a ghost is spread over several hundred nanoseconds. The filter structure, as well as the ghost parameter computations take this ghost spread aspect into account.

An infinite impulse response filter structure is preferred to cancel post-ghosts. However, a FIR filter is necessary to attenuate the pre-ghosts and to implement the waveform equalizer. In order to sufficiently attenuate the ghosts, these filters should have a larger number of bits than the input/output signals. Hardware may implement the filters with nine-bit precision. A hardware decoder operating at $4f_{sc}$, and meeting the specification for the post-ghost range of 45 $\mu$seconds, will require a finite impulse response filter having at least 650 taps. Rather than implementing such a long filter, we prefer an architecture that uses both an infinite impulse response filter and a finite impulse response filter requiring fewer taps, surrounding the locations of each ghost to be canceled. This approach, although it limits the number of ghosts that can be canceled, is better suited for a consumer product.

To provide synchronization separation, and clock generations, the in-phase signal component is utilized for deriving horizontal, vertical, and field synchronizing signals, as well as other necessary gating pulses such as the burst gate to generate the burst locked $4f_{sc}$ or $8f_{sc}$ (14.32 or 28.64 MHz) digitizing clock, a clamp pulse for setting the dc levels of the video to the A/D converters.

During digitizing of the in-phase video components only the inphase video component is used to attenuate the ghosts. The ghosted signal components must be "pre-conditioned" for the A/D converter. That is, the video component must be appropriately amplified, dc level-shifted and clamped for the selected A/D converters.

A ghosted signal is the sum of the reference signal and its ghosted components of various (lower) amplitudes and phases. Hence the deghosted version will be of lower peak-to peak amplitude. Thus the effective number of bits of the deghosted signal will be lower (compared to digitizing an equal peak-to-peak amplitude unghosted video signal.) This factor must be considered in selecting the precision of the A/D converter 18. The linearity of the A/D converters is extremely important for good deghosting performance and must be commensurate with the precision chosen. Currently implemented hardware a uses ten-bit TRW A/D converter, out of which only nine-bits may be used.

The hardware for the final deghoster product will have a microprocessor as controller 26, and associated required memory in the form of RAMs and ROMs for implementing the software and storing necessary data such as the reference CS-GCR signal, specific filter coefficients, etc. Present software, without optimization, requires $\approx 100$ KB memory but may be expect to be reduced significantly. It interfaces with an AMPRO system.

The VBI lines with the ghosted CS-GCR signal components from an eight field sequence are appropriately gated, retrieved, and algebraically processed to provide two signals. This ghosted CS-GCR signal data (two arrays) are then processed to compute the ghosted channel characterization.

The ghosted channel characterization is analyzed to compute the deghosting parameters for the post-ghosts, pre-ghosts and an equalizer filter.

An IIR filter is used to attenuate the lagging ghosts (post-ghosts), and an FIR filter is used for the leading ghost (pre-ghosts) attenuation. In an implementation, the FIR filter follows the IIR filter. This order is quite important since one filter will create the other type of "locally" generated ghosts which require adaptive cancellation.

In waveform equalization, the correlated (sin x)/x response is examined and an appropriate waveform equalization FIR filter is computed.

The CS-GCR signal itself does not place any inherent limitation on the ghost range. The deghosting range is completely dictated by pair-wise-constant VBI lines. Necessary range of the ghosted data must be captured to characterize the channel.

The CS-GCR signal, without any pair-wise-constant VBI lines,has $\approx 12$ $\mu$S range for the post-ghost attenuation which is equal to the front-porch, sync and burst duration. With the CS-GCR signal on VBI line 18 (like BTA), the deghosting range will be $\approx 75$ $\mu$S (63.5 $\mu$S VIR 12 $\mu$S of sync & burst region).

The deghosting hardware for canceling the lagging ghosts (IIR filter) is based on the concept of implementing a set of multipliers for each ghost. This approach allows receiver manufacturers to tailor their product lines in accordance with the number of ghosts to be canceled. The range of the ghosts is not limited; only the number of ghosts to be canceled within the range.

The hardware of one embodiment under consideration will be able to cancel up to nine individual ghosts or fewer spread ghosts or a combination of individual and spread ghosts. The software analyzes the ghosted CS-GCR signal, determines the degree of spread for each ghost and distributes the deghosting parameters accordingly.

The delay range of the hardware to be submitted for the tests will be $\leq 75$ $\mu$S. Lagging ghosts outside this delay range will not be canceled.

The CS-GCR signal is such that the software can compute the locations and magnitudes of leading echoes $\leq 10$ $\mu$S (burst+sync+front−porch). The hardware is being designed to attenuate all leading echoes using a 128 tap FIR filter. The range will depend on the number of leading ghosts. Leading echoes which are outside this range will not be canceled.

The maximum ghost level is expected to be at least 6 dB below the reference signal (D/U$\geq$6 dB). The software computes the deghosting parameter for even larger ghosts. The hardware can attenuate only ghosts which are 6 dB or more below the reference signal. The maximum ghost level is not limited by the ability of the software to compute the deghosting parameters but is limited by the performance of the hardware, including the circuit for deriving synchronizing signals, gating pulses, etc. in the ghosted environment.

The minimum ghost level to activate the canceler can be specified in from of a threshold. It is presently set to $\approx 30$ dB below the reference (D/U$\leq$30 dB). The software computes the deghosting parameters for all the ghosts above this level and downloads to the available hardware. If given to the ghost of highest amplitude.

As mentioned in 4.1, the doghosting concept favored by SamSung allows the hardware to be tailored for the number of ghosts to be canceled according to receiver manufacturer product line plans and/or marketplace laboratory and field test will cancel nine individual ghosts or fewer spread ghosts.

This parameter is dependent on the SNR of the incoming ghosted signal. Theoretical computations indicate that a ghost is attenuated to below $\leq 40$ dB. The software is being improved for consistently high ghost attenuation.

Ideally it should take $\approx 0.125$ second to capture an eight field sequence of the CS-GCR signal. It takes longer with current implementation. Thus the first step to generate and download the initial ghost parameters typically requires $\approx 2$ seconds. The second step which involves analyzing the sin X/x response to compute the waveform equalizing filter should take additional 0.1 seconds. Therefore, the total time of a current implementation is typically about 2 seconds.

The total time for the deghosting algorithm is comprised of a fixed portion and a variable portion. The fixed portion is associated with the signal acquisition, signal analysis, and equalizing filter calculations. The variable portion is associated with analyzing which individual ghosts to cancel and also depends on the total number of ghosts to be canceled. With our present implementation, the fixed portion should be $\approx 2$ seconds. The variable portion is almost insignificant except for a very low S/N condition.

A significant improvident in the picture occurs when the first step of the process is completed. An additional improvement occurs when the second step for the waveform equalization is completed. These improvements "snap in" rather than occurring gradually.

The current inventions have been described by way of exemplary embodiments. Various changes and modifications will be apparent to those skilled in the art to which it pertains. For example, while the examples used generally relate to the NTSC system, as will be apparent, the invention is readily applicable to other systems and standards, including the PAL system and so forth. It is intended that the invention be applicable to transmission by way of radio wave as well as by cable transmission. Furthermore, various time intervals are used in the examples given, and while such time intervals are used in the examples given, and while such time intervals serve to illustrate the principles underlying the invention, various changes may be made without changing the basic operation. Such changes and the like are intended to be within the scope and spirit of the invention which is only defined by the claims following and their equivalents.

We claim:

1. A ghost cancelling reference signal transmission and reception system, comprising:

source means for providing complementary sequence ghost cancelling reference signals each based from a respective one of a pair of equi-length digital sequences, the respective linear autocorrelation functions of which pair of equi-length digital sequences for all shifts except a specified one combine to zero;

means for providing broadcast signals by superposing said ghost cancelling reference signals upon television signals for transmission within vertical blanking intervals of said television signals;

means for receiving said broadcast signals via at least a principal path, each additional path of reception being a multipath, and detecting said broadcast signals to recover detected television signals comprising said television signals with superposed ghost cancelling reference signals and a ghost thereof for each said multipath;

means for separating each of said recovered complementary sequence ghost cancelling reference signals from said detected television signals;

adaptive filter means for attenuating ghost images within said detected television signals;

means for generating channel characterizations by correlating said recovered complementary sequence ghost cancelling reference signals as accompanied by ghosts thereof for each said multipath with waveforms of corresponding ghost-free complementary sequence ghost cancelling reference signals; and means for configuring said adaptive filter means in dependence upon said channel characterizations.

2. The system of claim 1 wherein said source means is of a type for providing complementary sequences of ghost cancelling reference signals with the sum of all linear auto-correlation functions of said complementary sequences being identically zero for all shifts other than zero.

3. The system of claim 1 wherein said equi-length digital sequences each consist of the same number of samples, each sample having one of two prescribed values.

4. In a television transmitter, the improvement comprising:

source means for providing complementary sequence ghost cancelling reference signals each based from a respective one of a pair of equi-length digital sequences, the respective linear autocorrelation functions of which pair of equi-length digital sequences for all shifts except a specified one combine to zero; and means for superposing said ghost cancelling reference signals each upon a respective selected scan line as cyclically occurs in vertical blanking intervals of television signals to be transmitted.

5. The improvement of claim 4 wherein said source means is of a type for providing complementary sequences of ghost cancelling reference signals with the sum of all linear auto-correlation functions of said complementary sequences being identically zero for all shifts other than zero.

6. The improvement of claim 4 wherein said equi-length digital sequences each consist of the same number of samples, each sample having one of two prescribed values.

* * * * *